April 21, 1964     A. LIEB     3,130,348
ARRANGEMENT FOR PRODUCING A VARIABLE ELECTROLUMINESCENT
SPOT SUBJECT TO POSITION CONTROL Filed Sept. 7, 1961     5 Sheets-Sheet 1

INVENTOR
*ALBERT LIEB*

BY

ATTORNEY

April 21, 1964     A. LIEB     3,130,348
ARRANGEMENT FOR PRODUCING A VARIABLE ELECTROLUMINESCENT
SPOT SUBJECT TO POSITION CONTROL
Filed Sept. 7, 1961     5 Sheets-Sheet 2

INVENTOR
ALBERT LIEB

BY

ATTORNEY

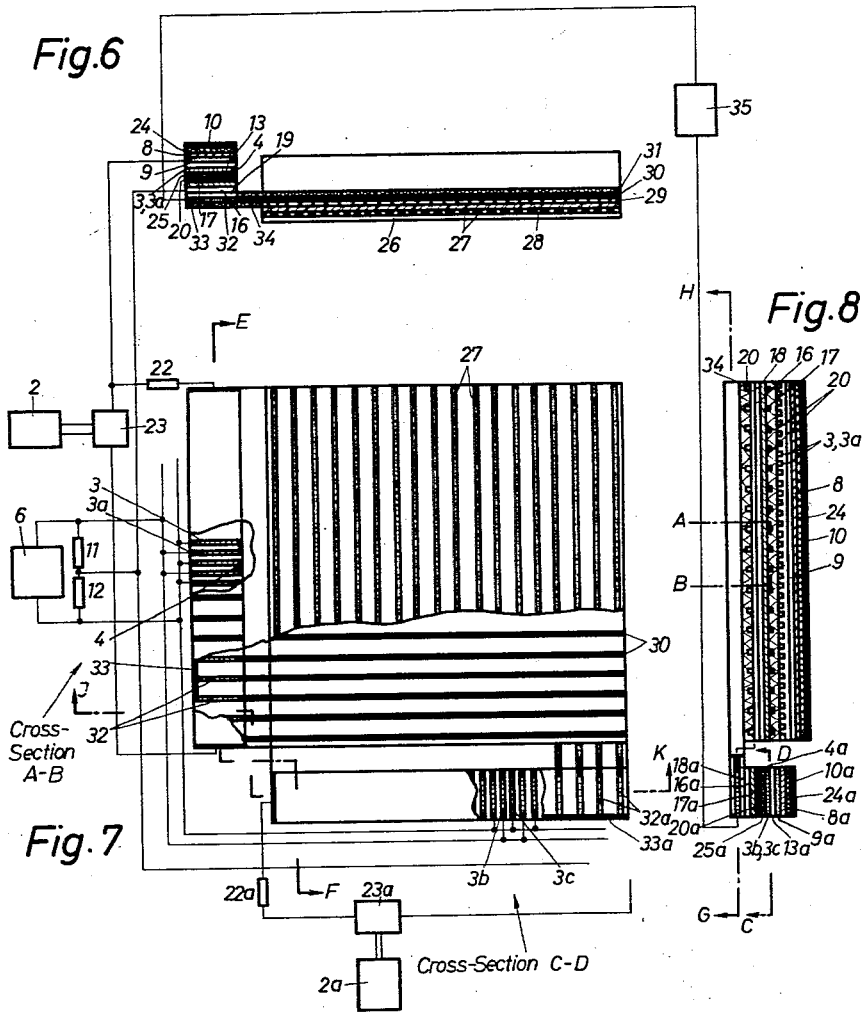

INVENTOR
ALBERT LIEB

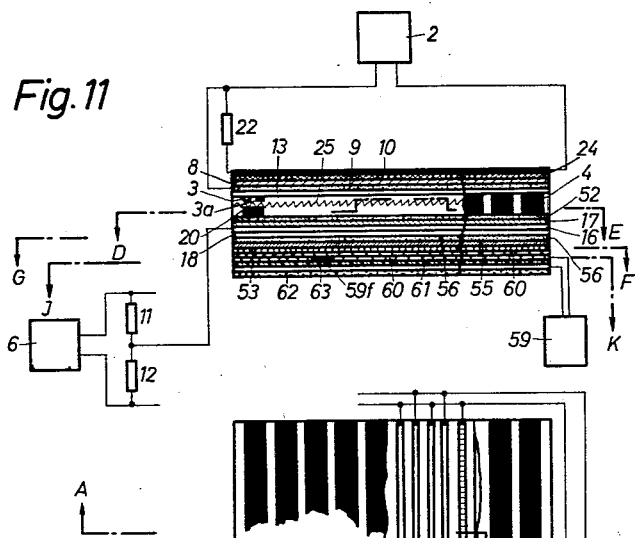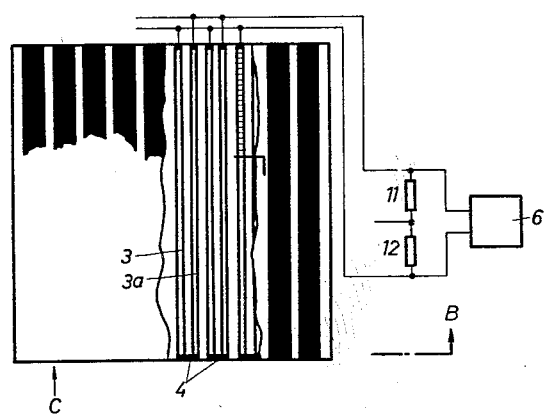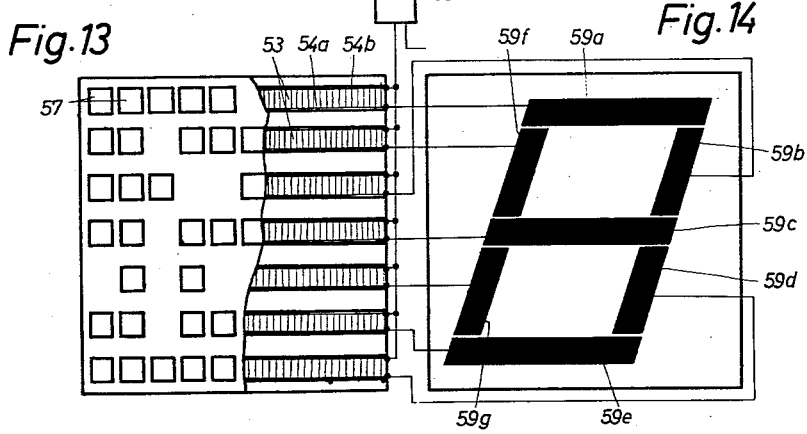

3,130,348
ARRANGEMENT FOR PRODUCING A VARIABLE ELECTROLUMINESCENT SPOT SUBJECT TO POSITION CONTROL
Albert Lieb, Stuttgart-Bad Cannstatt, Germany, assignor to International Standard Electric Corporation, New York, N.Y., a corporation of Delaware
Filed Sept. 7, 1961, Ser. No. 136,644
Claims priority, application Germany Sept. 9, 1960
17 Claims. (Cl. 315—149)

The present invention relates to a system for producing a variable luminescent spot subject to position control and to devices that use such a variable luminescent spot to advantage.

Such devices are, for example, voltmeters, digital-display units that show electrical magnitudes, devices for transmitting and/or converting radiation images and the like. Cathode-ray tubes, for example, have been used up to now to produce a variable luminescent spot subject to position control.

An object of the present invention is to provide an electroluminescent spot positioning system which takes up less space, is capable of any area expansion and is simple in design.

A feature of the present invention is the provision of a system which produces a variable luminescent spot subject to position control, for example, by means of an electroluminescent capacitor whose field strength varies in at least one direction. Pairs of radiation-sensitive layers for example, photoelectric resistances, are arranged in the direction of the variation in field strength, and are exposed to the light emitted by the electroluminescent capacitor, in which case corresponding ends of the radiation-sensitive layers of each pair are connected together and to an electrode of another electroluminescent capacitor, individual to that pair, and corresponding other ends of each pair are connected across an electroluminescence-producing voltage source whose electrical midpoint is connected to the other electrodes of the individual electroluminescent capacitors.

The above-mentioned and other features and objects of this invention will become more apparent by reference to the following description taken in conjunction with the accompanying drawings, in which:

FIGS. 6 through 8 are schematic diagrams of another embodiment of the present invention wherein an electroluminescent spot may be positionally controlled by means of two voltages;

FIGS. 11 through 15 are schematic diagrams showing how the present invention may be utilized for the digital display of voltage magnitude.

Figure 1:
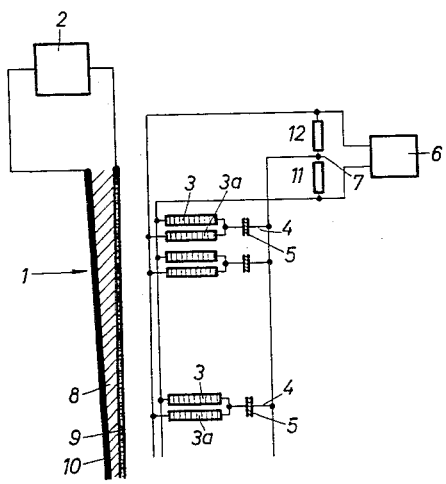
FIG. 1 is a schematic diagram of a preferred embodiment of a system for producing a variable luminescent spot subject to position control.

Referring to FIG. 1, a variable electroluminescence-producing voltage 2 is applied to electroluminescent control capacitor 1, consisting of electroluminescent layer 8, of conductive layer 9, permeable with respect to the electroluminescent radiation, and of conductive layer 10. As may be seen in FIG. 1, the space between conductive layers 9 and 10 varies. This results in a varying field strength in the direction of the wedge-shaped arrangement of the conductive layers. Arrangements are also provided wherein the field strength varies in more than one direction. For example, the electroluminescent capacitor may be circular and the space between the conductive layers will then vary in a radial or tangential direction. The variable field strength of the control capacitor may be arrived at in another way, for example in that a voltage drop is produced along the conductive layers, which produces a variation in field strength independently of the space between the conductive layers. Pairs of radiation-sensitive layers 3, 3a, arranged in series, are mounted in the direction of the field strength radiants of control capacitor 1. FIG. 1 shows a special type of such an arrangement wherein the radiation-sensitive layers (3, 3a) of each pair are arranged in series in the direction of field strength. The arrangement is preferably such that control capacitor 1 lies directly opposite layers 3, 3a, which change their property under the effect of the electroluminescent control capacitor's radiation. The layers may consist, for example, of photo-conductive resistances, such as Cu activated CdS or CdSe. Ends 4 of every two adjacent layers 3, 3a are connected each to an electrode of a subsequent electroluminescent capacitor 5. An electroluminescence-producing voltage 6 is applied to the other ends of layers 3, 3a. Electrical midpoint 7 of electroluminescence-producing voltage 6 is in each case connected to the other electrodes of subsequent electroluminescent capacitors 5. Electrical midpoint 7 of voltage 6 can, for example, be arrived at in the manner shown in the drawing, through identical resistances 11 and 12.

At a given voltage magnitude of source 2, a luminescent spot forms at electroluminescent capacitor 1, starting at the narrowest space between the conductive layers. The expansion of this spot in the direction of the varying field strength, depending on the magnitude of the voltage applied, is limited. This is due essentially to the special property of the electroluminescent effect that makes brightness highly dependent on the field strength. Layers 3, 3a, arranged in pairs in the direction of the field strength, are affected differently by the radiation. In the parts where no electroluminescent radiation is produced, the two adjacent layers have the same unchanged electrical properties. Radiated layers 3, 3a, which are far from the border area of the luminescent spot, are strongly affected by the radiation. But, since both radiation and conductance excitation tend toward a given saturation value, the difference in property change between two adjacent intensely radiated layers, 3, 3a is only inconsequential. Hence, electroluminescent capacitors 5 assigned to unradiated layers 3, 3a and also to radiated layers 3, 3a that are far away from the border area show little if any electroluminescence. Those layers 3, 3a that are affected by the border layer of the electroluminescent spot of capacitor 1 are the exception. Here there is a highly differentiated excitation of the conductance. The radiation-sensitive layers 3 and 3a are preferably so chosen that they show a particularly sharp variation in their electrical properties in the radiation intensity region of the boundary layer. Thus, capacitor 5 assigned to these layers 3, 3a shows strong electroluminescence. If voltage 2 is further increased, the expansion of the electroluminescent spot is increased further in the direction of the variable space between conductive layers and other layer pairs 3, 3a are thereby radiated differently, in which case the luminescent capacitor assigned to them is excited to electroluminescence. In this way a wandering electroluminescent bright spot is produced whose position can be controlled at will by varying voltage 2.

In the further embodiments, in which the references of FIG. 1 will be used for the same components, examples will be given as to how a variable luminescent spot subject to position control can be applied.

FIGS. 2, 3, 4, 5 show an arrangement whereby the magnitude of a voltage can be measured. As compared with the many known arrangements for measuring voltage, such as electromagnetic instruments, the advantage of this arrangement is that it is easy to manufacture, can withstand a high overload and offers maximum leeway in area expansion. Since the arrangement uses no mechanical parts, there is the further advantage of response stability.

Figure 2:
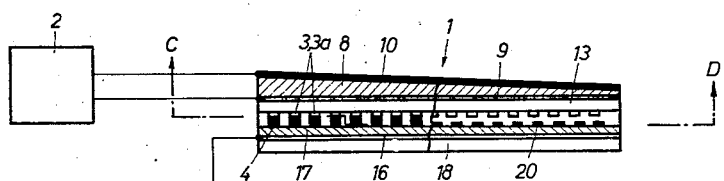
FIGS. 2 through 5 are schematic diagrams showing how the system of FIG. 1 may be utilized to measure a voltage.
Figure 3:
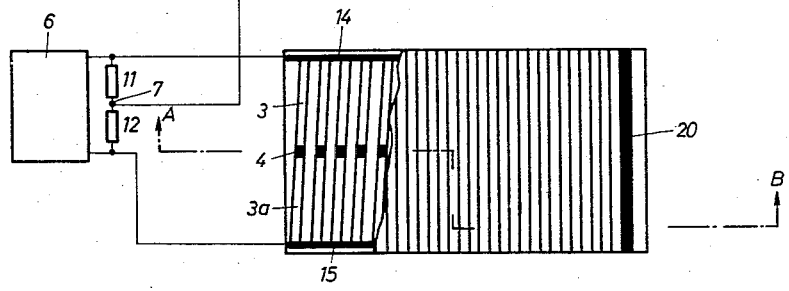
Figure 4:
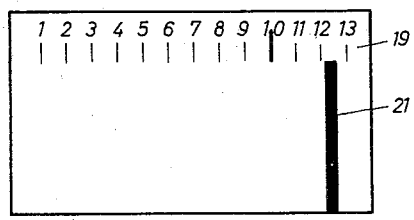
Figure 5:
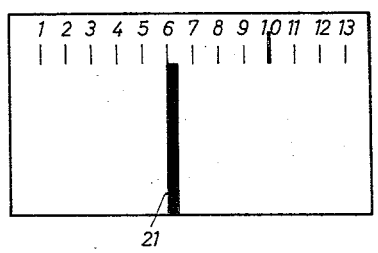

FIG. 2 shows a section in direction AB of FIG. 3, FIG. 3 a section in direction CD of FIG. 2 and FIGS. 4 and 5 examples of the luminescence indication of the measuring device.

Conductive layer 9, permeable to the electroluminescent radiation, is located on a suitable support 13, a foil or plate, a glass plate for example, permeable to electroluminescent radiation. This layer may be formed in known manner, say by a layer of cassiterite (tin oxide). On layer 9 there is an electroluminescent layer 8, for example an electroluminescent fluorescent layer (such as copper activated zinc sulphide or the like), embedded in a suitable dielectric such as Araldite, and a conductive layer 10, preferably one that is impermeable to radiation. This layer can be produced, for example, by vaporizing aluminum in a vacuum.

As the drawing shows, the space between 9 and 10 varies. Voltage 2, which is to be measured, is applied to layers 9 and 10. Support 13 also bears layer pairs 3, 3a attached in strips. The property of these layers, say the resistance or the capacitance, is changed sharply by the electroluminescent radiation. The pairs of radiation-sensitive layers (3, 3a) are arranged in series in the direction of the field-strength variation of electroluminescent capacitor 1. The layers of each pair are attached along straight lines whose direction deviates from the direction of the field strength variation by about 90°. This results in the required variable effect on the conductance of layer pairs 3 and 3a. The layers may be CdS or CdSe, for example, which sharply vary their resistance under the effect of the electroluminescent radiation. The layers may be applied to support 13, for example, by evaporization in a vacuum, by sintering or by spraying, preferably using a suitable embedding material, such as Araldite. The ends of radiation-sensitive layers 3 and 3a are connected to a conductive layer 14 and 15. The individual midpoints of layers 3 and 3a are also provided with a conductive layer 4 of appreciable thickness. These conductive layers can also be produced by evaporization or stamping of metals, such as aluminum, copper or silver.

Conductive connection 4 is connected to strip-like electrodes 20, which are almost parallel to layers 3 and 3a in the embodiment shown in the drawing. Strips 20 each form an electrode of additional electroluminescent capacitors. The other parts of these capacitors are formed by conductive translucent layer 16 and electroluminescent layer 17. Layer 16 is located on a support 18, permeable to the electroluminescent radiation produced in layer 17. The capacitors correspond in FIG. 1 to reference 5. Conductive strips 14 and 15 are connected to a luminescence-producing voltage 6. Across identical resistances 11 and 12, electrical midpoint 7 of voltage 6 is formed at their point of contact. Midpoint 7 is connected to optically-conductive layer 16. The latter may be, for example, SnO₂, which is attached to a suitable support 18, glass and mica for example. In accordance with the principle described in FIG. 1, variation of the measuring voltage 2 produces a luminous line, which wanders along in the direction of the difference in space between conductive layers 9 and 10. FIGS. 4 and 5 show the luminous image. The luminous line bears reference number 21. With the aid of a scale 19, which may also be electroluminescent, a measurement can be taken of voltage 2. The invention also provides for any arrangement of the scale, circular for example.

Figure 9:
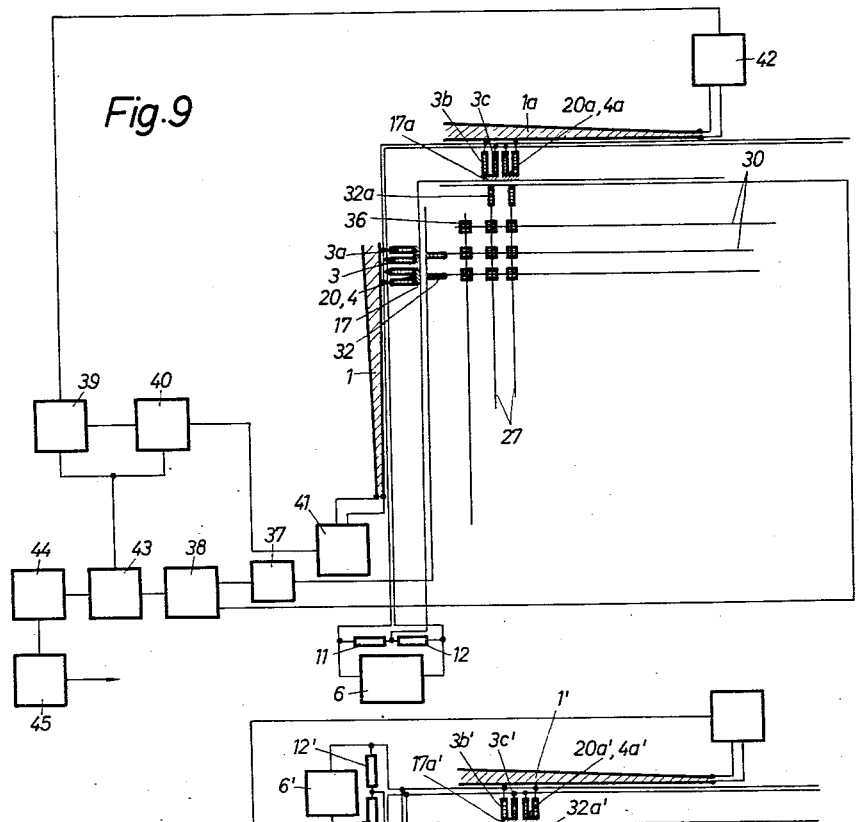
FIG. 9 is a schematic diagram showing how the system of FIGS. 6 through 8 may be utilized to record an image.
Figure 10:
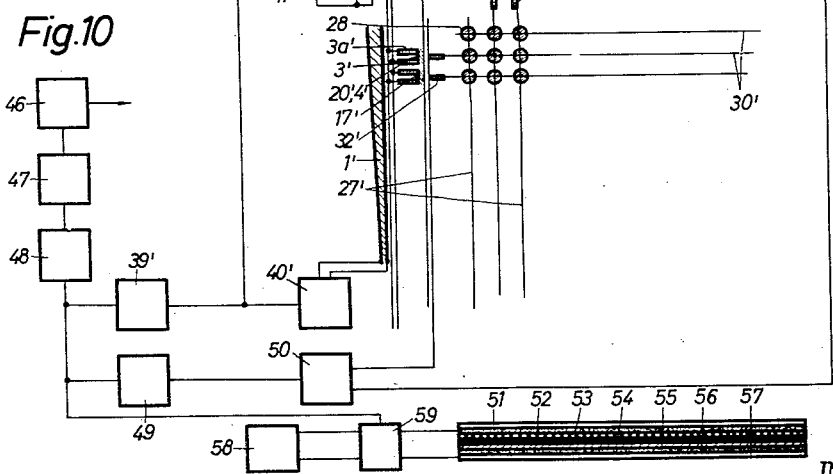
FIG. 10 is a schematic diagram showing how the system of FIGS. 6 through 8 may be utilized to reproduce an image.

FIGS. 6–8 show a further embodiment of the invention. In this arrangement an electroluminous spot can be produced whose variation in position on a surface can be controlled by means of two voltages. FIG. 6 shows a section in direction J—K of FIG. 7, FIG. 7 a section in direction G—H of FIG. 8, FIG. 8 a section in direction E—F of FIG. 7. FIG. 7 also shows partial sections in direction A—B and C—D of FIG. 8. The device may be used, for example, to convert a radiation image into electrical intelligence or to reproduce electrical intelligence in the form of a beam, say an optical beam. Through a multiple use of the device a radiation image can be transmitted and/or converted. FIGS. 9 and 10 show an example of this. As compared with the known devices that perform this task, the arrangement according to the invention has above all the advantage of not being cumbersome. There is no limit to the size of the area covered by the image reproduction, and the arrangement is simplified. The device is easy and inexpensive to manufacture, particularly in mass production, by using pressure or spray methods for the individual layers. It is based on the principle of the arrangement for obtaining an electroluminescent spot subject to position control shown in FIG. 1 and described in the text pertaining thereto. A detailed description of its mode of operation will be given in what follows.

On one side of strip-like supports 13 or 13a, which are substantially permeable to the luminescent radiation and, for example, are made of glass or mica, there are attached in series a conductive transparent layer, for example a SnO layer 9 or 9a applied to the support, an electroluminescent layer 8 or 8a, a layer 24 or 24a, whose electrical property, say its resistance, varies sharply, spasmodically for example, with the applied electrical field strength (polarizing layer), and a resistance layer 10 or 10a. The electrical resistance of layers 10 or 10a varies along the length of the strips. Layers 24 or 24a may consist of SiC particles, embedded in a suitable bond, say Araldite. As for its dependence on voltage, layer 24 or 24a is so designed that at a given assumed electrical field-strength corresponding to a sufficient luminescence excitation of layer 8 or 8a it lowers the resistance, for example, spasmodically. Along the resistance variation of layer 10 or 10a there suddenly appears an electroluminescence excitation. The brightness gradient in the marginal layer is particularly pronounced. Although no particular mention is made of it at this time, provision has been made to include in principle just such a polarizing layer, if necessary also in the other embodiments of the invention, before electroluminescent and/or radiation-sensitive layers.

On the other side of supports 13 or 13a there are attached in series pairs of photo-conductive strips 3 or 3a, 3b, 3c, a radiation-impermeable, electrically insulating layer 25 or 25a, conductive strips 20 or 20a, an electroluminescent layer 17 or 17a, a conductive transparent layer 16 or 16a, and another support 18 or 18a substantially permeable to the luminescent radiation. Conductive strips 20 or 20a and photo-conductive strips 3 or 3a, 3b, 3c, are arranged vertically to the length of strip-like supports 13 or 13a. The ends of every two photostrips 3 or 3a, as FIG. 7 clearly shows, are connected in pairs by conductive layers 4 or 4a. As FIG. 6 shows, layer 4 or 4a is so designed that in each instance it establishes conductive connections across radiation-impermeable insulating layer 25 or 25a to conductive strips 20 or 20a located under the photo-conductive strips. A variable electroluminescence-producing voltage is applied to the ends of resistance layer 10 or 10a across a resistance 22 or 22a. This variable voltage can be produced, say, by varying in time, for example, the magnitude of an electroluminescent voltage 2 or 2a with the aid of a control device 23 or 23a, in the simplest case with a resistance potentiometer, for instance. In place of a potentiometer, a control element can be used that varies its electrical property, its resistance for example, by means of a voltage, say a D.C. voltage, variable in time. Such a control element can be achieved, for example, with the aid of an electron tube. One pole of an electroluminescence-producing voltage is applied to the anode across a suitable resistance. The other pole is connected to the tube's cathode. The control voltage is applied between the control grid and the cathode. The electroluminescent capacitors or electroluminescent layers are parallel to the resistance, which is located between the electroluminescent voltage and the anode. The invention also makes provision to replace the tube with a different control element, a transistor for example.

Another electroluminescence-producing voltage generated by device 6 is applied to the free ends of photo-conductive strips 3 or 3a, 3b, 3c. The electrical midpoint of this voltage, produced with identical resistances 11 and 12, is connected to conductive transparent layers 16 or 16a.

In principle, this part of the device is in line with the principles given for embodiments 1–5 of a device for producing a variable luminescent spot subject to position control. The same references for similar components in FIGS. 1–5 have been used. In the present case, a luminescent line appears in electroluminescent layers 17 or 17a along conductive strips 20 or 20a. Layers 17, 17a, 20 and 20a form part of a luminescent capacitor, denoted by references 5 in FIG. 1. The light emitted by these electroluminescent capacitors 5 effects the conductivity of additional radiation-sensitive layers 32. The variable luminescent spot, which can be controlled in its surface position by two voltages, is produced in that part of the device that is mounted on transparent electrically insulating support 26. The support may be made of glass or mica, for example. On the support there are in series strip-like electrically conductive and transparent layers 27, an electroluminescent layer 28, a field-strength dependent layer (polarizing layer) 29, additional conductive strips 30 and an electrically insulating, optically impermeable layer 31. Conductive strips 27 are parallel to one another and vertical to conductive strips 30. The conductive strips thus form a Cartesian system of coordinates, in which the electrodes in each coordinate direction are arranged at a given distance from one another. If necessary, other coordinate systems can be set up by arranging and designing the conductive strips differently, say by using circular and beam-shaped conductive strips, which produce polar coordinates. Conductive strips 27 and 30 extend over the area represented by electroluminescent layer 28. In each instance, one end of strips 27 or 30 is connected to additional photo-conductive layers 32 or 32a. Photo-conductive strips 32 or 32a are parallel to conductive strips 29 or 20a and face one another. The ends of photo-conductive strips 32 or 32a are led across conductive connections 33 or 33a each to a common pole. In the present embodiment, these poles are connected to an electroluminescence-producing voltage source 35. In order to eliminate any disturbing external radiation effect on strips 32 or 32a, there is a radiation-impermeable, electrically insulating layer 34 over the photo-conductive strips. In order to eliminate any further disturbing effect on the device through external radiation, such layers may be applied to other parts of the device not required for observation. For example, the layer may be a radiation-impermeable varnish coating.

The device operates as follows: By varying the luminescence-producing voltage applied to resistance layers 10 or 10a, a variable luminescent line, whose position can be controlled, is produced in electroluminescent layer 17 or 17a in the manner already described. This causes layers 32 or 32a facing the luminescent strips to become conductive and electroluminescence-producing voltage 35 is applied across the energized photo-conductive strips to electrodes 27 or 30. At the electrodes' point of intersection the voltage threshold value of polarizing layer 29 is exceeded and there is a noticeable increase in that layer's conductivity, so those parts of electroluminescent layer 28 adjacent to the point of intersection are brought to electroluminescence. Thus, photo-conductive layers 32 and 32a also control the additional electroluminescent capacitors formed by electrodes 27, 30 and layers 28, 29. The observation or the transmission of the spot's radiation effect occurs over transparent support 16 or over transparent conductive layers 27. The luminescent spot produced in the form of a luminescent dot can be shifted in each coordinate direction by varying the magnitude of the voltages applied to layers 10 or 10a and thus its position on the surface of electroluminescent layer 28 can be shifted at will.

FIGS. 9 and 10 show schematically as an example the application of an electroluminescent spot whose position can be varied on a surface under the control of two voltages. With the device described a radiation image can be transmitted into another radiation image or it can be transmitted and simultaneously converted. The same references used for the previous embodiments have been used for similar components. FIG. 9 shows a device for image recording and FIG. 10 a device for reproducing the image. In conformance with the embodiment of FIG. 1, reference 1 denotes a controlling electroluminescent capacitor, whose electroluminescent surface varies with the magnitude of the applied voltage. In conformance with the embodiment of FIGS. 6–8, electroluminescent capacitors 1 may consist of layers 10, 24, 8, 9, 13. The radiation produced in electroluminescent capacitor 1 produces in the pairs of photo-conductive strips 3, 3a, 3b, 3c or 3', 3a', 3b', 3c' an excitation of the conductance. As already described, the conductance excitation of the strips that directly face the boundary zone of the electroluminescent surface in capacitors 1 is highly variable. Those parts of electroluminescent layers 17 or 17a assigned in each instance to these photo-conductive strips thereby become electroluminescent. Photo-conductors 32 or 32a, 32' and 32a' assigned to these layer parts are thereby made conductive. Conductors 32, 32a, 32', 32a' are in each instance led to common poles. The conductance can be determined at the poles. In the image-recording portion of the device, between conductive strips 27 and 30, which form a Cartesian coordinate system, there are layers or elements whose conductance varies sharply through the radiation of the image to be transmitted. The invention provides for making the layers or elements sensitive to a given electromagnetic or corpuscular radiation. For example, most photo-conductive layers, such as CdS and the like, are also sensitive to X-rays. By eliminating the disturbing optical radiation that generally occurs, the simplest way being by using light filters, an X-ray picture can thus be made visible without distortion or it can be converted and transmitted. By using CdTe or PbS, it is for example possible to make an infrared radiation image visible or to transmit it in converted form. In the image-recording device shown in FIG. 10 electroluminescent layers or electroluminescent capacitors are attached between conductive strips 27 or 30 and 27' or 30'.

Photo-conductive layers 32, 32a are connected over common poles to a voltage source 27 and an amplifier 38. Generators 39 and 40 together produce synchronized line- and image-change signals, voltage magnitudes for example, whose time plotting takes the form of a sawtooth curve. The time signals are led to electroluminescent voltage generators 41 and 42. The intensity of the electroluminescent voltage of these generators is modulated in accordance with the time signals reaching them. The electroluminescent capacitors 1 supplied by the generators show a variable field strength in the coordinate directions. Thus there results, controlled by the image-change and line-change signals, a periodic variation in the size of the luminescent spot of capacitors 1, 1a or 1', 1a'. Photo-conductive pairs 3, 3a thereby undergo a variable conductance excitation as a function of time. Capacitors 17, 17a, 17', 17a' are brought periodically to luminescence, so that electrodes 27, 30, 27', 30', which form the coordinate systems, are connected by the conductance excitation of the additional photo-conductive layers 32, 32a, 32', 32a' to the common poles. Image-change and line-change signals are so chosen that there is linear scanning of the conductance condition of the radiation layers or radiation elements located between conductive strips 27 and 30. The modulation appearing in image signal amplifier 38, corresponding to the image content, that is, the image's electrical intelligence, is mixed in control stage 41 with the time signals and led across a modulation device 44 to an amplifier or transmitter 45. Transmission to the receiver can be accomplished in any way desired, for example by radio or cable. Instead of an HF-transmission, an LF-transmission, for example, may be given consideration, such as transmission over telephone lines. At the receiving end shown in FIG. 10, the signals representing the image intelligence are amplified by control circuits 46, 47, demodulated and, if necessary, a post-amplification of the video signals that are here involved is effected. With the aid of buffer stage 48, the time signals are separated from the image signals and, just as at the pickup side, are led to generators 39', 40'. Control unit 50 represents an electro-luminescent voltage source, whose intensity is controlled by the image signals. Conductive layers 27', 30' are connected across photo-conductors 32', 32a' to voltage source 50. In conformance with the image signal there results an electroluminescence excitation of the layers or electroluminescent elements located between conductive strips 27', 30' and thereby the transmission of the radiation image striking the elements or layers 36. If the sensitivity of the radiation-sensitive layers' property change and the emission of the electroluminescent layers located between the coordinate electrodes of the receiving or reproduction device are made variable with respect to the spectrum region or to the type of beam, a radiation image can then be converted and/or transmitted. Cadmium telluride may be used for the radiation-sensitive layers and Cu activated CdSe for the electroluminescent layers. In that case, an infrared radiation image can be converted into an optically visible image and/or transmitted.

In order to increase the brightness of the transmitted image and to keep the luminescent image from flickering, the spot may be observed, if necessary, not directly, but through an afterglow device, an image amplifier and an image-storing unit. The simplest device of this type is an afterglow phosphorus layer. The layer is located between the observer and the image-transmission device. It may also be applied directly as an additional layer on the image transmission device. As the required response condition of the known afterglow phosphori is not easily met with electroluminescent light, the invention provides for also inserting image amplifiers and converters, preferably those based on the principle of electroluminescent and photo-conductive layers. A simple image-storing unit arrangement, intended to show the basic principle of such an arrangement, is shown schematically in the lower portion of FIG. 10. In front of the image-reproduction device there is such an arrangement on an optically permeable support 51, as also a transparent conductive layer 52, a photo-conductive layer 53, an electrically conductive, optically impermeable or semi-permeable layer 54, an electroluminescent layer 55 and an electrically conductive optically permeable layer 56, and another transparent support 57. Layers 52 and 51 are connected across a control device 59 to an electroluminescence-producing voltage source. The luminescent spot produced by the image-transmission device produces on layer 53 a corresponding conductance zone. The conductance produces on the assigned electroluminescent layer an electroluminescent spot amplified in intensity. By means of optical feedback between electroluminescent layer 55 and photo-conductive layer 53, an amplified afterglow or a storing of this electroluminescent spot is obtained, depending on the degree of coupling. In the case of storing, the intelligence given by the image transmission is stored until the electroluminescence-producing voltage is switched off, say by device 59. The device may be a switch, for example. When using the image-storing device with an image-transmission device, provision is made to erase the stored image intelligence before each image revolution or shortly before the actual line sweep.

FIGS. 11-15 show one application of the invention's variable luminescent spot subject to position control to the digital display of the magnitude of a voltage. As compared with the known arrangements for the digital display of an electrical magnitude, the advantage of the arrangement according to the invention is that it takes up little space and furthermore places no limitation on the size of the area for reproducing the symbols. In addition, it is very simple in design. The device can be easily and inexpensively manufactured, particularly in mass production, by using pressure or spraying methods for the individual layers. FIG. 11 shows a section in direction A—B of FIG. 12, FIG. 12 a section in direction D—E of FIG. 11, FIG. 13 a section in direction F—G of FIG. 11, FIG. 14 a section in direction J—K of FIG. 11, FIG. 15 an example of a display image obtained with the device. Voltage 2, which is to be measured, is applied across a resistance 22 to resistance layer 10 of the device. The electrical resistance of layer 10 varies along the section shown in FIG. 11. One pole of the test voltage is at transparent conductive layer 9. Conductive layer 9 is fastened onto a support 13 that is permeable to electroluminescent light. Between resistance layer 10 and conductive layer 9 there are an electroluminescent layer 8 and a voltage-dependent resistance layer 24 (polarizing layer). In varying the magnitude of the voltage of source 2, an electroluminescent area, variable in size, forms along resistance layer 10. Field-strength dependent layer 24 lowers its resistance at a given voltage located between resistance layer 10 and conductive layer 9. This results in a sharp definition of the electroluminescent spot forming in layer 9, something that is regarded as desirable from the standpoint of the invention. On the side of support 13 that faces conductive layer 9 there are parallel pairs of photo-conductive layers 3, 3a. At one end of each of these layers, 3, 3a a pole of an electroluminescence-producing voltage source 6 is applied. The two remaining free ends of the two photo-conductive layers are electrically connected together by means of conductive layer 4. Layer 4 establishes at the same time an electrical connection to conductive strips 20. In order to eliminate any disturbing electrical or radiation-type effect, there is an electrically insulating radiation-impermeable layer 25 between photo-conductive layers 3, 3a and conductive strips 20. That layer may consist, for example, of black-dyed Araldite. On the conductive strips there are, one after the other, another voltage-dependent layer 52, an electroluminescent layer 17 and a conductive layer 16, permeable to electroluminescent radiation and borne by a transparent support 18. These layers, together with the conductive strips, reference 5 in previous embodiments, thus form electroluminescent capacitors. These capacitors are arranged parallel to one another. The voltage midpoint of electroluminescent voltage source 6, produced by identical resistances 11 and 12, is applied to conductive layer 16. A luminescent line, variable and subject to position control, forms in electroluminescent layer 17 vertical to the direction of the resistance variation of layer 10. The luminescent line is in each instance assigned to the boundary layer, that is, to the layer with the greatest brightness gradient of the luminescent line (13) forming in electroluminescent layer 8. Any variation in voltage 2 causes the luminescent line produced in layer 13 to shift in the direction of the resistance variation of layer 10.

The luminescent line produced in layer 17 affects the conductance of additional radiation-sensitive layers 53.

These layers 53 are fastened on in strips parallel to one another and assume a position not parallel but preferably vertical to electroluminescent capacitors 5. Their edges are provided with conductive layers 54a and 54b. The invention also provides for designing the conductive layers of the radiation-sensitive layers in known fashion in a pectinate (comb-like) arrangement. Layers 53 are attached to a radiation-permeable insulated support 55, made of glass or mica for example. Between supports 55 and 18 and thus between electroluminescent capacitors 5 and radiation-sensitive layers 53 there is attached a radiation shield 56, an impermeable plastic and metal foil for example. At certain crossing points of conductive layers 20 and at photo-conductive layers 53, the shield has apertures 57. Through these apertures the radiation of the electroluminescent capacitors acts only on certain portions of the photo-conductive layers. This forms a crossbar switch in which radiation-sensitive layers 53 are in the open circuit and the switching process is released by the luminescence excitation of electroluminescent capacitors 5. The switch's circuit assignment can be determined by apertures 57 in shield 56. There are additional electrically conductive layers 59a–59g on the photo-conductive strips, insulated by radiation-impermeable layers. The shape and arrangement of these conductive layers 59a–59g represent symbol elements—in the case at hand, numeral elements or numerals. Above conductive layers 59a–59g there are one after the other an electroluminescent layer 61 and an electrically conductive layer 63 attached to a transparent support 62. When the device is in operation, one pole of an electroluminescence-producing voltage is applied to conductive layer 54b and one to conductive layer 63. The various conductive layers 54a are each connected to a conductive layer 59a–59g. Thus, an electroluminescent voltage is applied across the additional radiation-sensitive layers 53 of the switch to additional electroluminescent capacitors formed by conductive layers 59a–59g, 63 and electroluminescent layers 61. Apertures 57 in shield 56 are so chosen that with a voltage increase of source 2 the luminescent strips produced in layer 17 and wandering in the direction of the resistance variation of layer 10 cause photoconductive layers 53 to become conductive in such a sequence that in electroluminescent layer 61 the luminescent image of the numerals 0–9 appears in series. The device thus represents an electroluminescent digital voltage measuring instrument.

Figure 15:
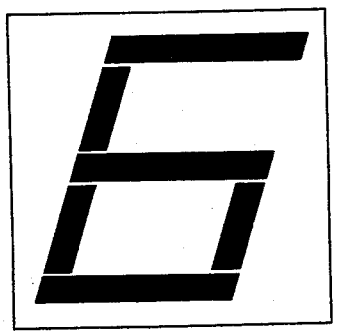

FIG. 15 shows the luminescent image of the device at a voltage magnitude of test voltage 2, which is assigned to numeral 6. This may be, for example, a voltage magnitude of 6 volts.

While we have described above the principles of our invention in connection with specific apparatus; it can be clearly seen that this description is made only by way of example and not as a limitation to the scope of our invention as set forth in the objects thereof and in the accompanying claims.

I claim:

1. A system for producing a light spot which is controllably variable in position comprising a single light emitting electro-luminescent capacitor having a first conductive layer, a second transparent conductive layer and an electroluminescent layer therebetween, means applying a variable voltage between said conductive layers, means causing the field intensity of said electro-luminescent layer to vary in at least one direction, a plurality of pairs of radiation-sensitive layers responsive to said emitted light arranged in the direction of said field intensity variation of said single capacitor, one end of each layer of said pairs being connected togther, a plurality of further electro-luminescent capacitors, one end of each of said further capacitors being connected to said connected layers of respective ones of said plurality of pairs of radiation-sensitive layers, the other ends of said radiation-sensitive layers and the other ends of said further capacitors being coupled to a second source of voltage.

2. A system according to claim 1 wherein said pairs for radiation-sensitive layers are arranged in spaced parallel strips, one behind another in the direction of the field-intensity variation.

3. A system according to claim 1, wherein said radiation-sensitive layers of each pair are arranged behind each other in the direction of the field-intensity variation.

4. A system according to claim 1, including means for producing a field intensity variable with time.

5. A system according to claim 1, having a second plurality of radiation-sensitive layers responsive to the light emitted from said plurality of further electro-luminescent capacitors.

6. A system according to claim 5, having a second plurality of electroluminescent capacitors responsive to said second plurality of radiation sensitive layers.

7. A system according to claim 6, wherein between the electrodes of the said second plurality of electroluminescent capacitors there is arranged a layer whose electrical resistance is changed with the field intensity.

8. A system arrangement according to claim 1, wherein between the electrodes of said single capacitor, whose field intensity is changed at least in one direction, there is provided a layer whose electrical resistance changes upon applying the electrical field intensity.

9. A system according to claim 4, wherein said variation in time is effected by a switching element which changes its electrical resistance, in response to variable voltage.

10. A system according to claim 9, wherein said switching element is a tube.

11. A system according to claim 9, wherein said switching element is a transistor.

12. A system according to claim 1, wherein the light spot is moved along a dial.

13. A system according to claim 12, wherein the dial is electroluminescent.

14. A system according to claim 1, wherein the plurality of further capacitors are arranged parallel in relation to one another, and that the radiation emitted by these further capacitors acts upon said radiation-sensitive layers which are arranged parallel among each other, but assume a non-parallel, vertical position in relation to the further capacitor.

15. A system according to claim 14, including a diaphragm between the plurality of further capacitors and the said radiation-sensitive layers having apertures through which the radiation of the said electroluminescent further capacitors only acts upon certain parts of the radiation-sensitive layers.

16. The system according to claim 1 wherein the other ends of said further capacitors are connected to the electrical midpoint of said second source of voltage.

17. The system according to claim 2, including an electroluminescent display panel wherein one arrangement of said single capacitor, radiation sensitive layers and further capacitors extend along one side of said panel and a second arrangement along a second side to form a coordinate system of crossed spaced strips which selectively energize portions of the panel therebetween.

References Cited in the file of this patent

UNITED STATES PATENTS 3,059,144    Bowerman _____ Oct. 16, 1962

FOREIGN PATENTS 1,117,682    France _____ Feb. 27, 1956